(12) United States Patent
Sparling

(10) Patent No.: US 10,871,358 B2
(45) Date of Patent: Dec. 22, 2020

(54) APPARATUS FOR PRODUCING CHARGED INCENDIARY SPHERES

(71) Applicant: Frederick Sparling, Fredricton (CA)

(72) Inventor: Frederick Sparling, Fredricton (CA)

(*) Notice: Subject to any disclaimer, the term of this patent is extended or adjusted under 35 U.S.C. 154(b) by 0 days.

(21) Appl. No.: 16/581,899

(22) Filed: Sep. 25, 2019

(65) Prior Publication Data

US 2020/0103210 A1 Apr. 2, 2020

(30) Foreign Application Priority Data

Sep. 28, 2018 (CA) .................................... 3019035

(51) Int. Cl.
*F42B 12/44* (2006.01)
*A62C 3/02* (2006.01)

(52) U.S. Cl.
CPC ............ *F42B 12/44* (2013.01); *A62C 3/0285* (2013.01)

(58) Field of Classification Search
CPC .......... F42B 12/44; F42B 12/00; F42B 12/36; F42B 12/46; F42B 33/00; A62C 3/0285
USPC ......................................................... 89/1.51
See application file for complete search history.

(56) References Cited

U.S. PATENT DOCUMENTS

| | | | |
|---|---|---|---|
| 1,276,402 A * | 8/1918 | Parkinson | F42B 12/44 102/365 |
| 1,294,645 A * | 2/1919 | Ford | F42B 12/44 102/365 |
| 2,278,949 A | 4/1942 | Sabini | |
| 2,379,784 A | 7/1945 | Brand | |
| 2,737,889 A * | 3/1956 | Barker | F42B 12/44 102/365 |
| 3,785,358 A | 1/1974 | D'Angelo | |
| 3,951,067 A * | 4/1976 | Schroeder | F42B 12/44 102/364 |
| 5,816,232 A | 10/1998 | Bell | |
| 6,877,433 B1 | 4/2005 | Stevenson | |
| 7,275,529 B2 * | 10/2007 | Boys | F41B 7/00 124/66 |
| 7,451,679 B2 | 11/2008 | Stevenson et al. | |
| 8,316,750 B2 * | 11/2012 | Toeckes | F41F 7/00 89/1.51 |
| 8,434,397 B1 | 5/2013 | Deckard | |

(Continued)

FOREIGN PATENT DOCUMENTS

CA 2761242 A1 6/2013

OTHER PUBLICATIONS

Ignis v1.2 Operational Manual, DJI M600 Variant, Drone Amplified, Inc, updated Aug. 14, 2019.

*Primary Examiner* — Derrick R Morgan
(74) *Attorney, Agent, or Firm* — Bonini IP Law, LLC; Frank J. Bonini, Jr.

(57) ABSTRACT

An apparatus for processing incendiary capsules for the purpose of prescribed burning. The apparatus includes a reciprocating injector tube driven by a crankshaft and a reciprocating mechanical pump driven by a cam. In order to synchronize these reciprocating motions the crankshaft and cam are joined together as a single part. The incendiary spheres exit a hopper and line up in series in a tube which deposits them one by one into a nest. Each individual sphere is punctured in the nest by a needle then injected with reactant. Each sphere is then withdrawn from the nest and dropped through a discharge opening before the next incendiary in line is processed in the same manner.

21 Claims, 13 Drawing Sheets

(56) References Cited

U.S. PATENT DOCUMENTS

| | | | |
|---|---|---|---|
| 8,601,929 B2 | 12/2013 | Stevenson | |
| 8,776,693 B2 * | 7/2014 | Toeckes | A62C 3/08 |
| | | | 102/364 |
| 9,199,735 B2 * | 12/2015 | Sparling | F42B 12/44 |
| 9,759,517 B2 * | 9/2017 | Toeckes | F42B 12/44 |
| 10,151,560 B2 | 12/2018 | Sparling | |
| 2003/0006319 A1 | 1/2003 | Silverstein | |
| 2004/0074487 A1 | 4/2004 | Christopher | |
| 2004/0134475 A1 * | 7/2004 | Jong | A45F 5/02 |
| | | | 124/52 |
| 2006/0027380 A1 * | 2/2006 | Stevenson | A62C 3/0285 |
| | | | 169/45 |
| 2006/0169263 A1 * | 8/2006 | Boys | F41B 7/00 |
| | | | 124/66 |
| 2010/0101401 A1 * | 4/2010 | Toeckes | F41F 5/00 |
| | | | 89/1.51 |
| 2010/0282230 A1 * | 11/2010 | Toeckes | A62C 3/025 |
| | | | 124/71 |
| 2012/0325192 A1 * | 12/2012 | Pham | F41B 11/72 |
| | | | 124/73 |
| 2013/0061738 A1 * | 3/2013 | Stevenson | F42B 12/44 |
| | | | 89/1.51 |
| 2013/0206913 A1 * | 8/2013 | Stevenson | A62C 3/02 |
| | | | 244/137.1 |
| 2014/0283672 A1 * | 9/2014 | Sparling | B64D 1/06 |
| | | | 89/1.51 |
| 2016/0265890 A1 | 9/2016 | Sparling | |
| 2018/0215679 A1 * | 8/2018 | Stevenson | C06C 9/00 |
| 2020/0158478 A1 * | 5/2020 | Green | F41J 5/26 |

* cited by examiner

Mounting Plate

Crankshaft - Cam
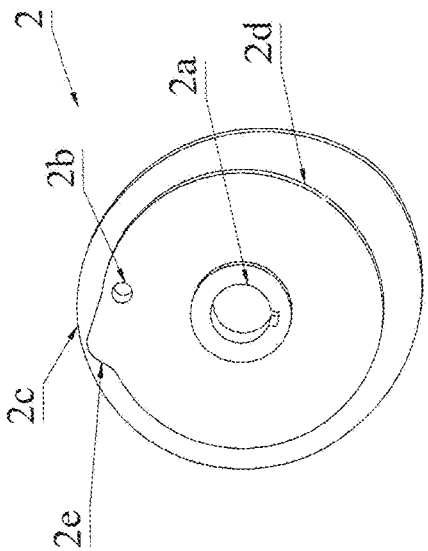
Figure 2B - Right Side
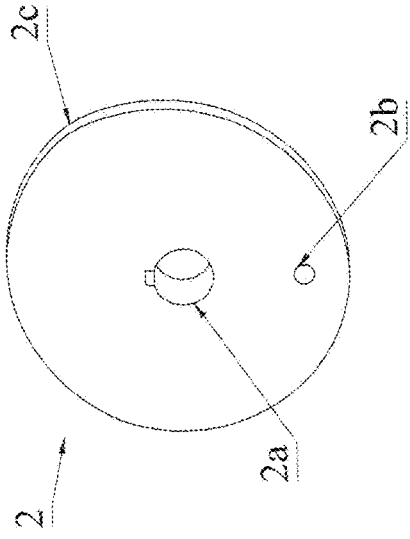
Figure 2A - Left Side Connecting Rod

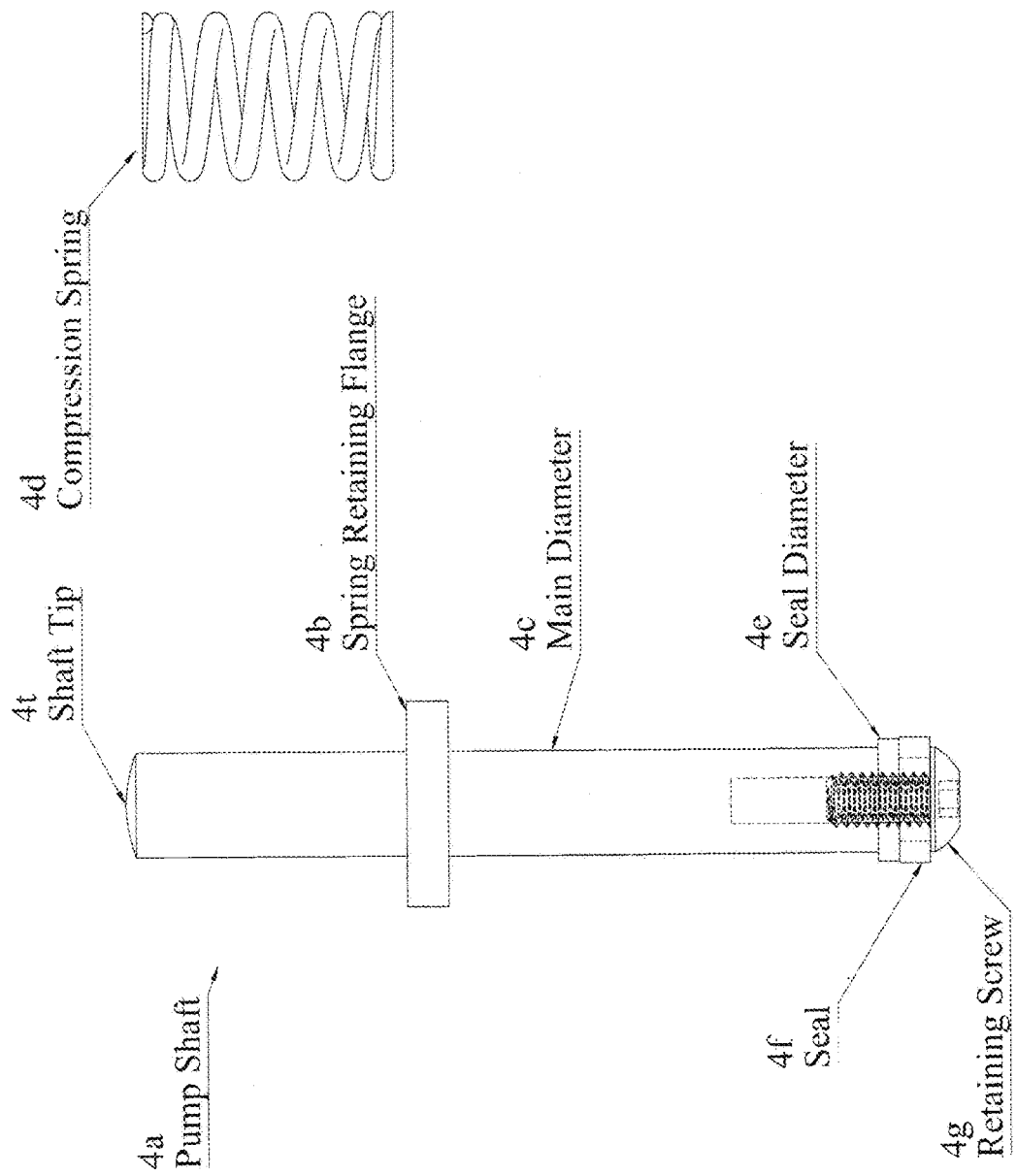

Pump Assembly

Injector Tube Assembly

Mounting Block

Functional Structure

APPARATUS FOR PRODUCING CHARGED INCENDIARY SPHERES

BACKGROUND OF THE INVENTION

1. Field of the Invention

This invention relates to intentional burning, often called 'prescribed burning' for wild-land and wildlife management purposes including forest fire management, and in particular to an apparatus for processing incendiary capsules for the purpose of conducting such prescribed burning.

2. Brief Description of the Related Art

Prescribed burning is a common forest fire prevention activity that is also well recognized to produce many wild-land, environmental, agricultural and wildlife benefits. A variety of methods and devices are employed to do this. One main methodology uses flammable liquid which is ignited as it exits the ignition device. Examples of such devices range from hand held 'drip torches' to helicopter slung 'heli-torches', or to vehicle-mounted devices, often called 'terra-torches', which eject ignited fuel under pressure much as does a military-type flamethrower. Such torches are powerful fire starters, but all flammable liquid methods carry with them certain disadvantages. The first such disadvantage is the obvious potential danger to the personnel who operate them. Secondly, although such devices are effective for starting fires, they tend to consume a large quantity of fuel relative to both the number of fires they start, and to the total area they burn; consequently the ongoing need to re-fuel these devices, which includes the storage, transportation, and often mixing of fuel, imposes a significant operational challenge in the field. This also adds environmental risk and significant expense. Thirdly, there exist several physical limitations regarding the design, construction, and operation of any mechanical device which processes and ignites flammable liquids. Such limitations can be related for instance to the need to avoid fuel or flame leakage, or to mitigate the consequences if such leakage occurs, or to other design restrictions due to the potentially detrimental effect of burning fuel upon the components of the device. These are some of the reasons why it is desirable to design and employ an ignition apparatus which processes neither flammable liquid, nor flame itself.

One existing method of igniting prescribed burns which avoids the need to emit ignited liquids is that commonly referred to as 'delayed ignition'. The most common method of delayed ignition is a machine that processes plastic incendiary capsules. Such machines are commonly referred to as PSD machines ('Plastic Sphere Dispenser'). Each plastic capsule is partly filled with a granular incendiary material such as potassium permanganate, and, as the capsule is processed within the machine it is injected with a reactant such as ethylene glycol. As a result, after a delay of about 20-30 seconds, the now-mixed chemicals react with one another to create flame, which then causes the plastic capsule to burn. This burning capsule becomes the source of ignition for whatever ground material is intended to be burnt. The main advantage of delayed ignition is the delay itself; this is what allows for a method, or device, that does not have to process actual flame, but rather it processes what can be referred to as a 'pre-flame' capsule. This delayed ignition technique is the method employed in the present invention.

It is sometimes desirable to conduct prescribed burning from the air. This is especially true if the terrain is difficult to traverse by ground, or if the area to be burnt is very large, in which case the time required to do so by traditional ground based methods may exceed the time window within which optimal burning conditions (wind speed and direction, temperature, relative humidity, etc.) can be expected to persist. When prescribed burning is conducted from the air, this is usually done by helicopter. This can be done by 'Heli-torch' as previously mentioned, or, it is also known to install a PSD machine within the cabin of the helicopter, or, to mount the PSD machine as an external 'sling load' of a helicopter. It is also known, as a more recent development, to mount a PSD machine in a UAS (Unmanned Aircraft System) also called UAV (Unmanned Aerial Vehicle, or Un-crewed Aerial Vehicle) also commonly called "drone", which is the terminology used in this document. Drones have the advantage of being capable of flying at night or in smoke, and of course, without risk to flight crew(s). A PSD is capable of producing 'charged', or injected delayed-ignition spheres, which are dropped by gravity from the aircraft, helicopter, or drone, to the ground below.

There are currently known to be at least six helicopter-deployed delayed-ignition machines, five of which would be considered to be PSD's because they produce charged plastic spheres. One company also markets a series of manually deployed, and ground vehicle deployed, PSD devices and at least two companies or individuals produce a prescribed burning machine which is deployed by drone.

One helicopter deployed device is described in U.S. Pat. No. 7,451,679 (Assignee: Raindance Systems Ltd., hereinafter referred to as "Raindance"). Strictly speaking Raindance would not qualify as a "PSD" machine because it does not employ plastic spheres. This device is designed to be used in combination with a specific 'series-connected incendiary' (separate U.S. Pat. No. 6,877,433) which is a flexible belt comprising a large number of blister pack like incendiaries connected in series which are fed into Raindance in a manner similar in general principle to that of an ammunition belt that is fed into a machine gun; each incendiary is in turn injected with reactant, then led to a cutter which separates it, then is dropped upon the ground. As noted in the patent document one of the main improvements sought by Raindance is the elimination of the jamming problem, and also the internal fire problem that is sometimes associated with prescribed burning devices that process individual spheres. The manner in which Raindance has overcome this problem however still leaves two disadvantages. The first is caused by the irregular shape of the incendiary; while the symmetrical aerodynamics of a sphere ensure the predictability of that sphere's flight path when falling through the air, irregular shapes, especially flat, lightweight irregular shapes, are subject to flutter and to unpredictable flight patterns, and, they are also more subject to becoming hung up in the forest's canopy top in cases where it is the forest's undergrowth that is the object of the prescribed burning. Secondly, the Raindance incendiaries provide less thermal energy for ignition purposes than does the inherently more-dense sphere. Raindance has further described in U.S. Pat. No. 8,601,929 B2, a functionally similar device which is enclosed in an outer casing to allow it to be transported as an external load of a helicopter and lastly, in U.S. Pat. No. 8,935,975, Raindance has described a second system which feeds a belt of incendiary capsules. Recently, this Raindance system has also been mounted for use by drone, but of course this is not a plastic sphere dispenser, or PSD.

In addition to Raindance there are at least five helicopter-deployable PSD machines which do use sphere-shaped incendiaries. The Mark III, the Mark V, and the Red Dragon are three of the five. The Red Dragon (U.S. Pat. No. 8,776,693 B2) employs agitation and gravity to line up plastic spheres within downward sloping groves which have their exit in a chamber within which each sphere is injected with liquid reactant. To inject each sphere that enters this injection chamber, it is first forced horizontally on to a needle which pierces the ball, then reactant is pumped into the sphere, then the ball is moved horizontally in the opposite direction thus withdrawing the ball from the needle, and finally the ball is moved over an opening through which it falls into a discharge tube and then to the ground below. This method is oriented to the processing of a stream of balls wherein each ball is exposed to certain treatment as it progresses through the machine. The horizontal ball-piercing, then ball-rolling, and the ball-to-ball contact causes occasional minor leakage of chemical residue from within the sphere as opposed to the present invention which drops each sphere into a discharge tube before the next in line is selected to be injected with liquid reactant. As a consequence of this residue, and also of this general methodology wherein sphere motion is slightly random, occasionally there will be a ball which becomes jammed, or a ball which has been injected with reactant that does not exit. In this case a fire will occur within the machine. When this happens, the operator is directed to activate the emergency water supply to extinguish the fire. It is a major objective of the present invention to provide a device which does not build up internal residue, does not jam, and does not experience internal fires. All three of these devices (the Red Dragon, the Mark III and the Mark V) employ a common sphere processing methodology.

A forth prescribed burning device which also employs incendiary spheres is described in U.S. Pat. No. 9,759,517 (hereafter called by its market name Sling Dragon). This device is deployed by helicopter, either as an internal or an external load. To process incendiary spheres, Sling Dragon uses a complex system of three coordinated interacting rotating components: [1] a rotating feed mechanism at the bottom of the hopper, [2] a rotary sphere delivery mechanism which mounts below the feeder which drops spheres into it, and [3] a rotary injector mechanism which rotates in a counter direction and which includes three needles supplied by three pumps. The middle of these three rotating mechanisms is used to deliver a sphere to one of the rotating injector needles.

A fifth device which also employs incendiary spheres has been produced by Firecraft Products Inc. (U.S. Pat. No. 9,199,735 B2, assigned by its inventor F. Sparling to Firecraft). This product (hereafter called Firecraft) also processes incendiary spheres, but in contrast to the four devices described above, employs an entirely different mechanical system to do so. The Firecraft design is complex. The main processing mechanism is a triple piston (a piston within a piston within a piston), the reciprocating motion of which is driven by three separate but synchronized cams. Incendiary spheres first exit a hopper and line up in a tube. Then each individual sphere exits, by force of gravity, from this tube into a cavity of an intermittently-driven, but also synchronized, rotary feeder which feeds them in to the main piston just as that piston pauses briefly at top center. The piston above the main piston includes a needle which punctures each sphere and the piston above that acts as a reactant pump. During each downward stroke of this triple piston, individual spheres become charged, meaning they are penetrated by a needle, reactant is pumped through that needle, then the needle is withdrawn, then finally each charged incendiary is wedged out of the machine each time the piston passes through bottom center. This system has the advantage of processing one incendiary at a time, and it does so in a manner whereby each sphere is held in an upright position, thus does not leak chemical residue within the machine. Firecraft therefore has the advantages of being generally failsafe from internal ball jams and internal fires. It is however complex, and because of this complexity it is subject to occasional problems with one or another of its various mechanisms, and, it is difficult to repair and to maintain. The complexity of Firecraft also results in it being significantly heavier and significantly more difficult to manufacture. Finally, Firecraft is excessively tall; the balls flow through it in a generally vertical direction, which is one of the reasons why it is able to operate without undue risk of jams or fire, but this advantage comes at the cost of additional height. Its height makes it more difficult to operate from whatever vehicle it is deployed by. It is a major objective of the present invention to provide a device that not only avoids internal jams and fires, but, in contrast to the just described devices, is simple, reliable, easy to operate, easy to maintain and repair, has a low profile, and particularly in its embodiment which is intended for deployment by drone, is very lightweight.

Finally, concerning the above noted five helicopter-deployed PSD devices that employ incendiary spheres, it is seen that all are unable to provide a solution in terms of one important operational deficiency: namely, they are "black boxes", which means it is not possible for the operator to visually monitor what exactly is going on inside the machine. If residue is building up, or if spheres are not flowing properly, the operator has no visual means of becoming aware of a pending problem until he or she encounters an actual ball jam, or a fire. Therefore, it is also an important objective of the present invention to lay out the mechanisms such that a viewing port, or window, can be included whereby it is possible for the operator to visually monitor, either directly or with a camera, those critical functions of ball-flow, ball-injection and ball-discharge. It should be understood that the term "ball-injection" actually includes a series of three actions: [1] forcing a needle through the outer surface of a plastic sphere, [2] pumping liquid reactant through that needle, and [3] withdrawing the needle from the sphere. This three part ball injection process is necessary to the functioning of all PSD devices that employ incendiary spheres, including of course the present invention.

A series of delayed-ignition, sphere firing devices designed for deployment by ground, or ground vehicle, are produced by a company. The PyroShot (U.S. Pat. No. 7,275,529 B2) is a spring loaded hand launcher for ground deployed ignition. The same company also produces a series of HS (high speed) models which include a CO2 tank for the purpose of propelling the charged sphere for a longer distance. Further, the same company, in partnership with another company has introduced its Green Dragon product (U.S. Pat. No. 8,316,750 B2). The Green Dragon also employs pressurized CO2 to launch each sphere over a long distance but it is too large and heavy to be used by a person on foot, so it is designed to be mounted on a vehicle. A review of the original patent indicates that PyroShot's mechanisms for performing the basic tasks of feeding a sphere into the machine, injecting reactant into the sphere, and ejecting the sphere from the machine are unique, and are fully dissimilar to the mechanisms employed in both the above discussed devices and the present invention. Also one major differentiation between all PyroShot products and the previously discussed PSD machines is the fact that the PyroShot devices are designed not just to produce a charged incendiary which is dropped by gravity, but to also then launch those charged incendiaries for a distance. A helicopter can position itself wherever it wants, thus gravity drops are all that is required. Ground vehicle deployment however is another matter; vehicles must follow trails and unless it is acceptable to drop incendiaries right on the trail, which is almost never the case, a means of launching the incendiaries for a distance must also be included. Such launching is what all PyroShot products do in fact accomplish.

The PyroShot patent teaches that during the manual compression of a spring within a sliding barrel, a sphere drops into the barrel and then the scissors-like action between side panel (136) and pivoting element (128) force a needle (126) to puncture the sphere which is then injected with reactant. Completion of the full spring compression cycle causes a release which propels the now charged sphere. With the HS and the Green Dragon models, a CO2 system has been added for the purpose of impelling the spheres for a longer distance than is possible with a device that employs just a compression spring.

There also exists at least one device that is used for the limited and specific task of launching charged incendiary spheres. U.S. patent application Ser. No. 15/265,220 describes a device that receives charged spheres and then launches them for a distance using spinning wheels to do so. This is an example of a separate device which could be used in tandem with the present invention for the purpose of ground vehicle prescribed burning; employing gas pressure to launch charged incendiary spheres is a second example. It should be understood however that the present invention is a complete and separate apparatus that is in no way dependent upon any other specific apparatus.

In conclusion to the discussion of existing prior art, there is at least one PSD device that is deployed by drone, and this will be referred to by its marketing name: IGNIS. The Ignis is a system, mounted on a drone that processes spherical-shaped charged plastic incendiary capsules for the purpose of prescribed burning. To charge a sphere Ignis employs a multi-step process: first, a motor is used to power linear motion of a plate-mounted needle for the purpose of puncturing the sphere; this plate mounted needle is attached to a syringe that is much like a medical syringe including its plunger. Second, the plunger of the syringe is moved forward for the distance that is required to pump a predetermined volume of liquid reactant through the needle and into the incendiary sphere. Third, the first motor is reversed in order to draw the needle back out of the sphere, then fourth, the sphere is discharged from the system. In order to increase the flow rate of incendiaries, Ignis duplicates the process, so it has a side A and a side B, each of which is performing the above described tasks. Ignis has a hatch door which must be in the open position for operations. Ignis stores one portion of the liquid reactant in its two syringes and the remaining portion in its reactant tank; when a syringe has been emptied during operations, those operations are paused while the empty syringe is refilled from the reactant tank. As will be seen, the sphere processing methodology of the present invention bears little commonality to that of the Ignis system as described above.

SUMMARY AND OBJECT OF THE INVENTION

NOTE: Numbers in round brackets, example (99), refer to part or assembly numbers used in other than a drawing being referenced. Numbers in square brackets, example [3], are to enumerate a list.

The general objective of the present invention is to provide an improved delayed-ignition apparatus that can be deployed by a vehicle. There is a variety of possible vehicles with which such an apparatus might be deployed such as a helicopter, either within the cabin of the helicopter or carried as an external sling load, or, a ground vehicle such as a pick-up truck or ATV/UTV where it can be used in combination with a second device which is used to throw, or launch, the charged incendiaries that drop out of the present invention. Another useful vehicle for deploying the apparatus is a drone, which will provide several advantages in comparison to conventional aerial prescribed burning. The present invention is intended to be safe, simple, reliable, low profile, capable of high cycle speed, and to be easy to operate, and easy to maintain. The present invention seeks to remedy periodic problems inherit with existing equipment, namely: chemical residue build-up, sphere jamming, and internal fires. Finally, for safety and operational reasons, the present invention arranges the components such that all critical sphere processing functions are visually observable by the machine's operator, or in the case where the operator is not adjacent to the device, visually observable through a camera.

BRIEF DESCRIPTION OF THE DRAWINGS

The drawings which show by way of example the preferred embodiments of the invention are as follows:

FIG. 2A is a perspective view of the crankshaft cam 2 as viewed from its left side; and FIG. 2B is a perspective view of the crankshaft cam 2 as viewed from its right side;

FIG. 4A is a view of the pump assembly showing the pump shaft assembly 4a plus a separate view of the compression spring; and FIG. 4B is a left side cut-away view of the entire pump assembly including shaft 4a;

DETAILED DESCRIPTION OF THE INVENTION

Figure 1:
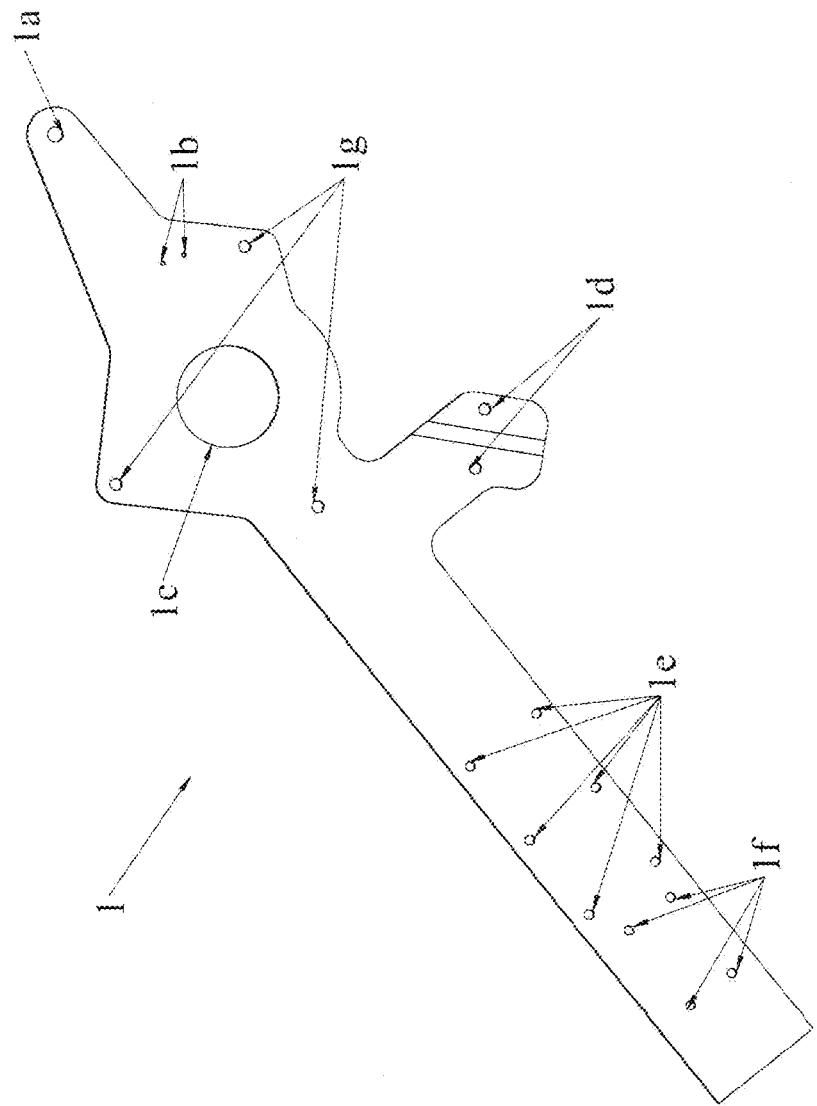
FIG. 1 is a left side view of the mounting plate 1.

There are eight main mechanical parts, or assemblies, which combine to form the underlying mechanical design that gives the apparatus its particular functionality and capabilities. The first is mounting plate (1) which mounts and connects together, the other seven parts or assemblies. Towards the top of this mounting plate is positioned a "crankshaft-cam" (2) which is bolted through a bushing so it can rotate. This double-named part is called 'crankshaft' because it mounts a connecting rod (3) which converts rotational motion to linear reciprocating motion, and, called 'cam' because it has a cam surface on its outer circumference; in actuality there is not one but two individual cam surfaces on the outer circumference of the crankshaft-cam. One of these cam surfaces drives the reciprocating motion of mechanical pump assembly (4), and the second cam surface triggers an electrical on/off switch. The other end of the connecting rod is bolted to the upper end of reciprocating injector-tube assembly (5). Thereby, rotation of the crankshaft-cam causes reciprocation of both the pump and the injector tube. In the embodiments illustrated, the means to drive the reciprocating motion of said reciprocating injector tube comprises the crankshaft. The pump assembly includes a housing which has a bore within which a pump shaft reciprocates; this pump shaft is spring loaded to the withdrawn position; the cam surface will push it down then the spring will return it. Each full rotation of the crankshaft-cam causes one pump stroke. The injector-tube assembly includes an internal pathway to allow for the flow of liquid reactant; this pathway's intake end connects to a tubing nipple (5c) used to receive pressurized flow from the pump, and its output end connects to the needle (6) which penetrates and injects liquid reactant into each incendiary sphere. The needle is sealed to the injector-tube with an O-ring. The injector tube is mounted within the bore of the injector-tube mounting body (7), which in this preferred embodiment is a rectangular block but could be made from any shape that included a bore through its body. The final and lowermost component is nest assembly (8). This nest assembly includes a main body, a flapper plate, and a transparent side cover. The eight parts or assemblies referred to in this paragraph, in their assembled state, form functional structure (9) of the apparatus. This functional structure, when provided with motive power to rotate crankshaft-cam (2), and when supplied with liquid reactant to pump (4), and when supplied with incendiary spheres to nest (8), will perform the function, or purpose, of the present invention.

In alternative embodiment AD there are eight main mechanical parts, or assemblies, which combine to form the underlying mechanical design that gives the apparatus its particular functionality and capabilities. The first is mounting plate (101) which mounts and connects together, the other seven parts or assemblies. Towards the top of this mounting plate is positioned a "crankshaft-cam" (102) which is bolted through a bushing so it can rotate. This double-named part is called 'crankshaft' because it mounts a connecting rod (103) which converts rotational motion to linear reciprocating motion, and, called 'cam' because it has a cam surface on its outer circumference. This cam surface drives the reciprocating motion of mechanical pump assembly (104), and it triggers an electrical on/off switch. The other end of the connecting rod is bolted to the upper end of reciprocating injector-tube assembly (105). Thereby, rotation of the crankshaft-cam causes reciprocation of both the pump and the injector tube. The means to drive the reciprocating motion of said reciprocating injector tube comprises the crankshaft. The pump assembly includes a housing which has a bore within which a pump shaft reciprocates; this pump shaft is spring loaded to the withdrawn position; the cam surface will push it down then the spring will return it. Each full rotation of the crankshaft-cam causes one pump stroke. The injector-tube assembly includes an internal pathway to allow for the flow of liquid reactant; this pathway's intake end connects to a tubing nipple (105c) used to receive pressurized flow from the pump, and its output end connects to the needle (106) which penetrates and injects liquid reactant into each incendiary sphere. The needle is sealed to the injector-tube with an O-ring. The injector tube is mounted within the bore of the injector-tube mounting body (107), which in this alternative embodiment is a generally rectangular block but could be made from any shape that included a bore through its body. The final and lowermost component is the nest assembly (108). This nest assembly includes a main body, a flapper plate, and a transparent side cover. The eight parts or assemblies referred to in this paragraph, in their assembled state, form functional structure AD of the apparatus. This functional structure, when provided with motive power to rotate crankshaft-cam (102), and when supplied with liquid reactant to pump (104), and when supplied with incendiary spheres to nest assembly (108), will perform the function, or purpose, of the present invention.

In the preferred embodiment, the apparatus is driven by an electric gear motor (10) which is used to rotate the crankshaft-cam. This gear motor is electrically wired in a manner that allows for its RPM to be controllable within a certain maximum/minimum range. In the preferred embodiment main motor RPM is controlled by switches mounted on a tethered hand controller. It should be noted that any means to rotate the crankshaft-cam, for instance a hand crank or a pneumatic motor, would achieve the same desired result. This desired result can best be understood by examining the design of the crankshaft-cam. Firstly, in its application as a crankshaft, it is connected via a connecting rod to the top end of the injector tube that is mounted for reciprocating action. Every full rotation of the crankshaft results in one full-down, plus one full-up, linear motion of the injector tube. It is during the full-down stage of the injector tube's motion that the incendiary sphere (22) becomes punctured. Secondly, the two cam surfaces of the crankshaft-cam activate both the reactant pump and an on/off switch. The reactant pump will be more fully explained shortly but looking now at the cam's effect on the pump we see that the stem of the spring-loaded pump shaft (4a) rides along the cam's outer perimeter (2c) such that, at the location where the cam's radius is greatest the pump shaft is most depressed against its compression spring (4d), and where the radius is least the pump shaft is most released in the direction of the spring's force. In fact however, for a certain arc portion of the cam's least radius, the stem of the driveshaft is no longer in contact with the cam surface; this is to leave an access space for the purpose of manually priming the pump. In alternative embodiment AD it is not necessary to leave such an access space because all that circumference of the cam that never comes in contact with the pump stem is cut away for weight saving. It is critical that this cam-driven pump action be synchronized with the reciprocating motion of the injector tube. The pump stroke must not occur until after the incendiary sphere has been fully punctured, then, the pump stroke must occur fairly quickly before the needle is withdrawn from the ball. In this preferred embodiment, there exists on the perimeter of the crankshaft-cam, as noted, a second cam like surface ($2d$) which is used to trigger an off-switch, in alternative embodiment AD there is no second cam surface, the one cam surface that is already there to work the pump also works the off-switch. A specifically positioned off-switch is necessary because it is not acceptable to turn the machine off randomly; it must be stopped in an exact position, namely: it must be stopped only after one charged incendiary has been discharged from the machine but before the next-in-line incendiary is punctured and injected; this is referred to as the safe position. If the machine were to be stopped in other than the safe position it would result in a burning incendiary being left inside the then inactive machine. It should be understood that using this second cam surface as a means of ensuring that rotation/reciprocation is stopped in a safe position is not the only possible way of doing so. It would be possible for instance to locate the off-switch such that it would become triggered by contact with the injector tube, or some abutment attached to it, which would trigger each time the ejector tube reaches the top position, or, as in fact is the case in alternative embodiment AD, it is possible for crankshaft-cam ($102$) to, in addition to its crankshaft job and its pump activation job, also activate the stop-switch. A cam surface is deemed to be superior because it smooths out the cyclic shock forces applied to the switch and the pump. All of the mechanical or electro-mechanical activities described in this paragraph are ultimately driven by an electric gear motor ($110$). In the preferred embodiment, and in alternative embodiment AD, a 90 degree gearbox has been used mainly because it is compact and takes up less space.

The flow of incendiary spheres through the apparatus begins at the hopper ($12$) where the spheres are deposited in bulk. A rotating agitator (not shown) located in the hopper sump near the exit hole is driven by the hopper motor ($14$). In the preferred embodiment the hopper motor is wired in parallel to the main motor. This means that every time the main motor is activated for rotation the hopper motor will rotate as well, the only difference is that the hopper motor's RPM is constant, while the main motor's RPM is variable and controllable. There is a hollow s-shaped feed tube (not shown) which connects the hopper discharge stub ($13$) to the entrance of the nest assembly ($8c$). Spheres, under agitation, drop into this feed tube and line up in series. The first sphere to enter the tube will exit the tube and lodge in a semi-circular cavity ($8b$) at the end of the sphere's path called the "nest". The sphere cannot fall out of its nest because there is a flapper valve in the way of the nest exit opening. The only way out is when the injector tube descends and impales it on its needle, then, as the needle withdraws it takes the sphere with it while the flapper valve bends to allow it to pass out of the nest exit opening. Then, as the the needle fully withdraws within the bore ($7a$) of mount block ($7$) and the sphere tries to follow it, the ball is too big to fit within that bore so it becomes stripped from the needle. At this point the unattached sphere is not above the nest, it is above the discharge ($8d$) so it falls into and through that opening.

The sphere falling through the discharge represents the completion of a four-part cycle, which to repeat is: [1] the injector tube and its needle proceeds downwards from its full-up, or full-withdrawn, position until at the end of its stroke it pierces the incendiary sphere, then [2] reactant fluid is pumped into the sphere, then [3] the needle proceeds to its full-up position while pulling the impaled sphere which becomes stripped from the needle as the needle is fully withdraw, then [4] the ball falls through the discharge. The next cycle then begins as the needle heads back and impales the next-in-line ball which is now sitting in the nest, having replaced the previous sphere as soon as the previous sphere was removed.

The pathway for reactant flow would be entirely open and unobstructed all the way from the reactant storage tank to the needle if it were not for the check valves. The check valves are mechanisms that allow flow in only one direction. These valves are normally spring closed, even to their flow direction; to open them, a certain amount of pressure is required; this can be either positive pressure on the intake side of the check valve, or negative pressure on the output side. It is not possible to open them from the other direction; any pressure from the other direction will just further seat the valve in the closed position. If this were not the case, the pump system would not function properly: on the intake stroke, instead of reactant being drawn from the tank, air would be drawn through the needle, and during the pump stroke, reactant could just as well flow back to the tank instead of out through the needle. Understanding this, we can now look at the pump assembly ($4$). It is a simple mechanical pump with its pump shaft ($4a$) on the driven end pushed down by the cam, and a seal ($4f$) on the other end working in reciprocating action within the narrow bore ($4n$) of the pump. As the cam further rotates after each push, or down stroke, the seal is returned by spring force to the up position thus re-filling reactant for the next stroke. Just below the furthest reach of the seal lies a second or counter bore ($4p$) in the pump housing which is laid out perpendicular, and connected to, the main pump bore. These two bores therefore form a simple T-joint. This second bore includes an input check valve ($4q$) on one side and an output check valve ($4r$) on the other. The input check valve is connected by tubing, usually transparent or translucent, to the reactant tank ($11$) and the output check valve is connected by tubing to the injector tube assembly ($5$) at nipple ($5c$). On the downward pump stroke, pressurized reactant opens the output check valve on its output end then flows through the check valve. On the return stroke, negative pressure, or suction, opens the intake check valve then draws in reactant along its source lines. The final result is one squirt of reactant, with a volume equal to pump displacement, passing through the needle ($6$) with each full rotation of the pump cam. In the preferred embodiment there is also a three way ball-valve ($4s$) installed between the tank tubing and the input check valve. This ball-valve can be selected for: [1] normal operations, [2] flow shut-off, or [3] tank drain. The preferred embodiment of the present invention also includes a third check valve ($6k$) which is connected directly to the needle. The purpose of this third check valve is to create a flow check directly at the needle for the purpose of precluding any unwanted dripping from the needle. As referenced, output from the pump flows directly to the injector tube assembly ($5$), then to an internal bore that terminates in a reservoir chamber ($5e$) located at the end of the tube body. This chamber is open ended, and has a female thread ($5f$). The needle, which has a male thread and a sealing O-ring, is screwed in to the end of the tube body. In summary, and in accordance with the information of this paragraph, described here is a reactant flow system which, excluding a tank vent, is sealed all the way from its storage tank to its output needle which will pump a constant and pre-determined volume of liquid reactant for each full rotation of the previously described crankshaft-cam (2). Although referred to as a needle, the needle may also be considered a sharpened tube.

Figure 10:
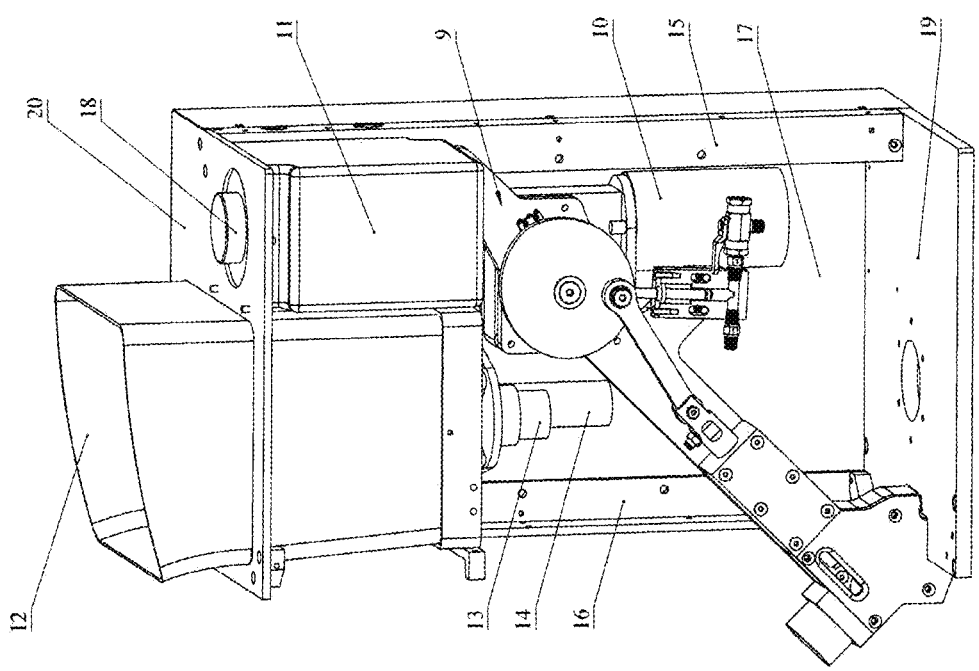
FIG. 10 shows a left side perspective view of a typical configuration whereby functional structure 9 is mounted, supplied with incendiaries, supplied with liquid reactant and placed inside a covered frame. This typical configuration represents an example of the mounting of the present invention, including examples of its necessary accessories such as incendiary hopper and reactant tank, when it is attached to, and used from a vehicle, be that vehicle a truck, an ATV, a UTV, a boat, internally by helicopter, externally by helicopter, or any other vehicle. For purposes of viewing this figure, the front and left covers, the front left leg, and the flexible hose connecting the nest entrance to the hopper discharge 13 are removed from the drawing.
Figure 12:
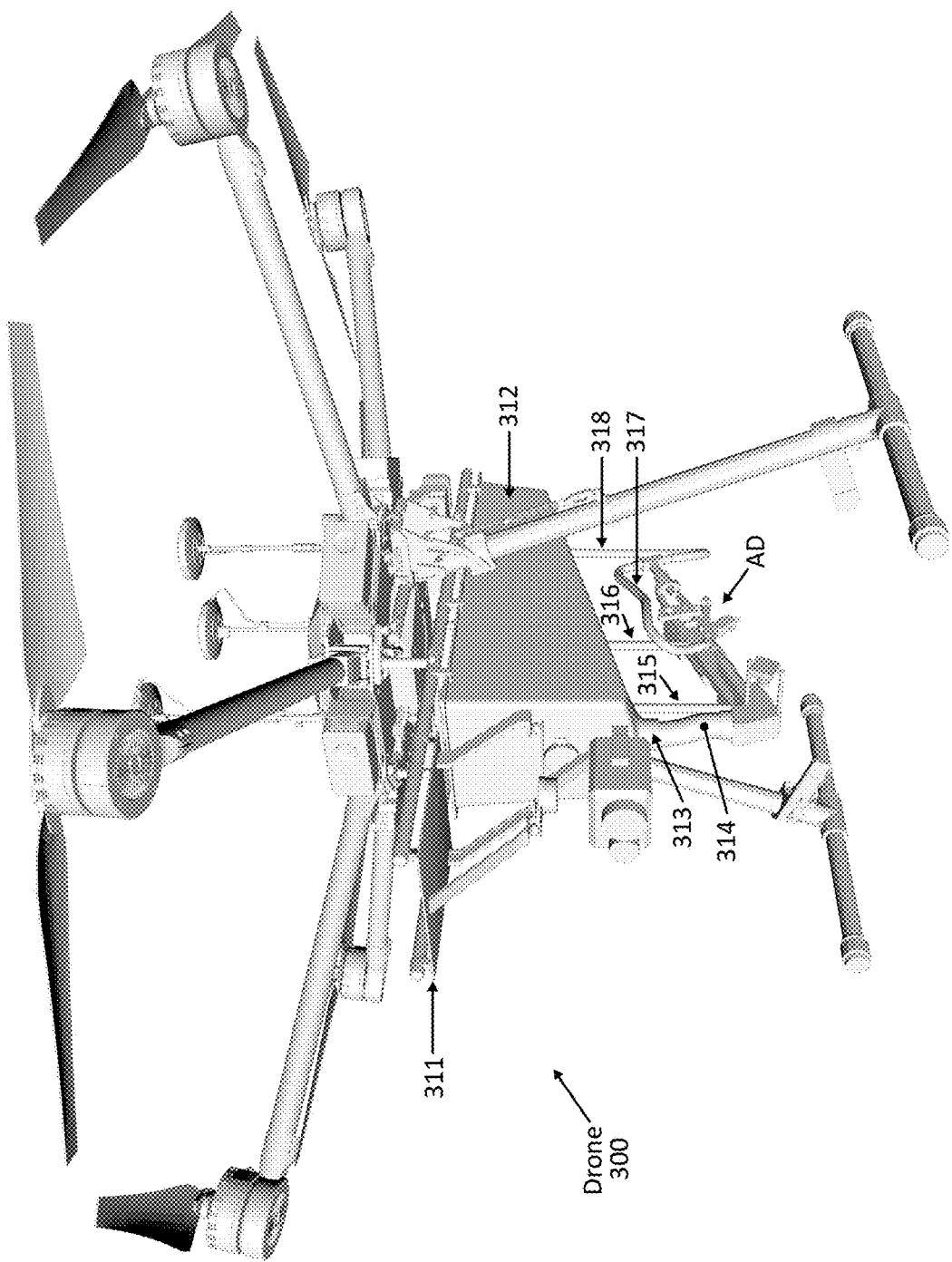
FIG. 12 is a left front perspective view of alternative embodiment AD mounted for deployment by drone, showing an exemplary representation of a drone, and the device AD mounted on the drone, and also showing a hopper containing the incendiary spheres feeding into the device AD.

The above paragraphs are a description of the salient elements and support elements of the present invention. A finished prescribed burning device based on these elements requires additional parts and assembly. All components must be mounted, numerous electrical components are needed, for instance power cable, wiring harness, relay box and control switches. This will all need to be mounted in a logical and functional fashion. It most cases the apparatus will be arranged within a covered frame, an exception to this might be when mounted on a drone whereby, because weight is such a critical factor for drones, a covered frame might be excluded. FIG. 10 of the drawings show a partial or cutaway example of one such covered frame, in this case a frame which includes a bottom plate (19) and top plate (20) wherein the two plates are joined by three vertical legs (15), (16), and a third leg not shown, thus forming a skeleton or mainframe which is then enclosed within cover panels (17) and two not shown, that are attached to these legs. Earlier, it was stated that the main modes of deployment that are intended for the apparatus are: [1] internal load by helicopter, [2] external load by helicopter, [3] ground vehicle, or [4] Drone. The structure depicted in FIG. 10 shows by way of example a configuration intended for ground vehicle deployment but it must be recognized that in the case of helicopter or drone deployment, the structural layout of all necessary support components or structures will or may vary significantly from the arrangement shown in FIG. 10. The present invention as laid out and included for drone deployment is as depicted in FIG. 12.

The mechanisms described above form the working basis for a delayed-ignition apparatus for prescribed burning which is designed for simplicity, safety, high speed, reliability, operator visibility, compact size, and ease of both operation and maintenance.

NOTE: Numbers in round brackets, example (99), refer to numbers used in other than the drawing being referenced.

FIG. 1 shows the mounting plate 1 which directly or indirectly mounts the other eight parts or assemblies which combine to form functional structure (9), which is the present invention. The bolt hole 1a is to mount the completed assembly (9) on the frame that mounts it. Three bolt holes 1g are to mount main motor (10). Clearance hole 1c is to mount crankshaft-cam (2). Two bolt holes 1d mount the pump assembly (4). Six bolt holes 1e are to attach mount block (7). Four bolt holes 1f are to mount nest assembly (8). Two bolt holes 1b mount the switch (21).

In FIG. 2A viewed from the left side, is shown the crankshaft-cam 2 which attaches to mounting plate (1) at clearance hole 2a within which a brass bushing is pressed. Connecting rod (3) attaches at bolt hole 2b. It is seen that the outer perimeter surface 2c is not a circle, meaning it is not a constant radius from center 2a, it is a cam that has a major and a minor radius. It is the major radius that pushes, or strokes, the pump shaft tip (4t) of the reactant pump (4).

Figure 9:
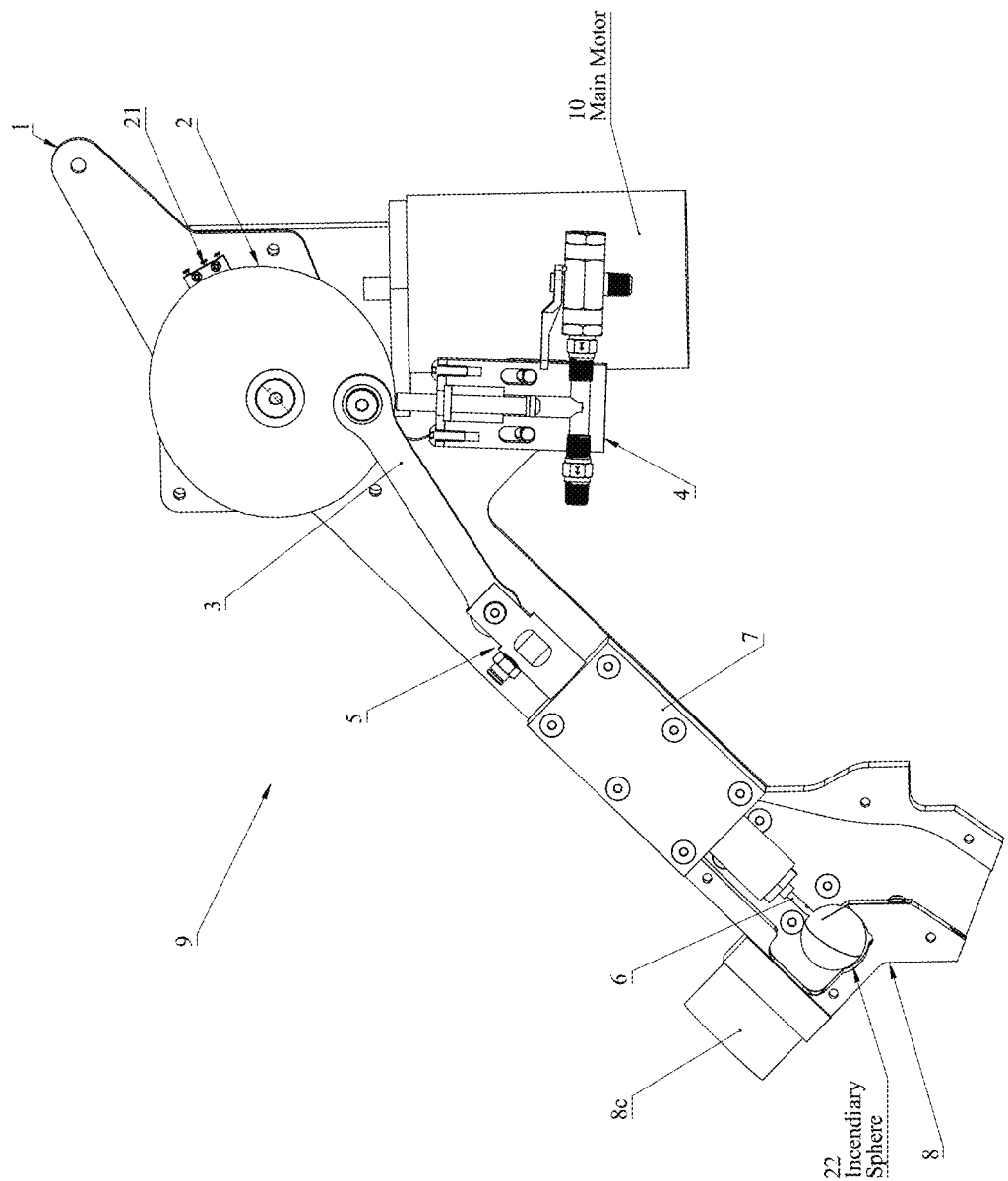
FIG. 9 is a left side perspective view of the parts or assembles shown in the previous eight drawings now connected together in their assembled state, to which is added main motor 10 to form functional structure 9 of the present invention.

On the right side of crankshaft-cam 2, as seen in FIG. 2B, is a second cam-like surface 2d which is used, at protruding curve 2e, to activate electric switch (21) shown in FIG. 9.

Figure 3:
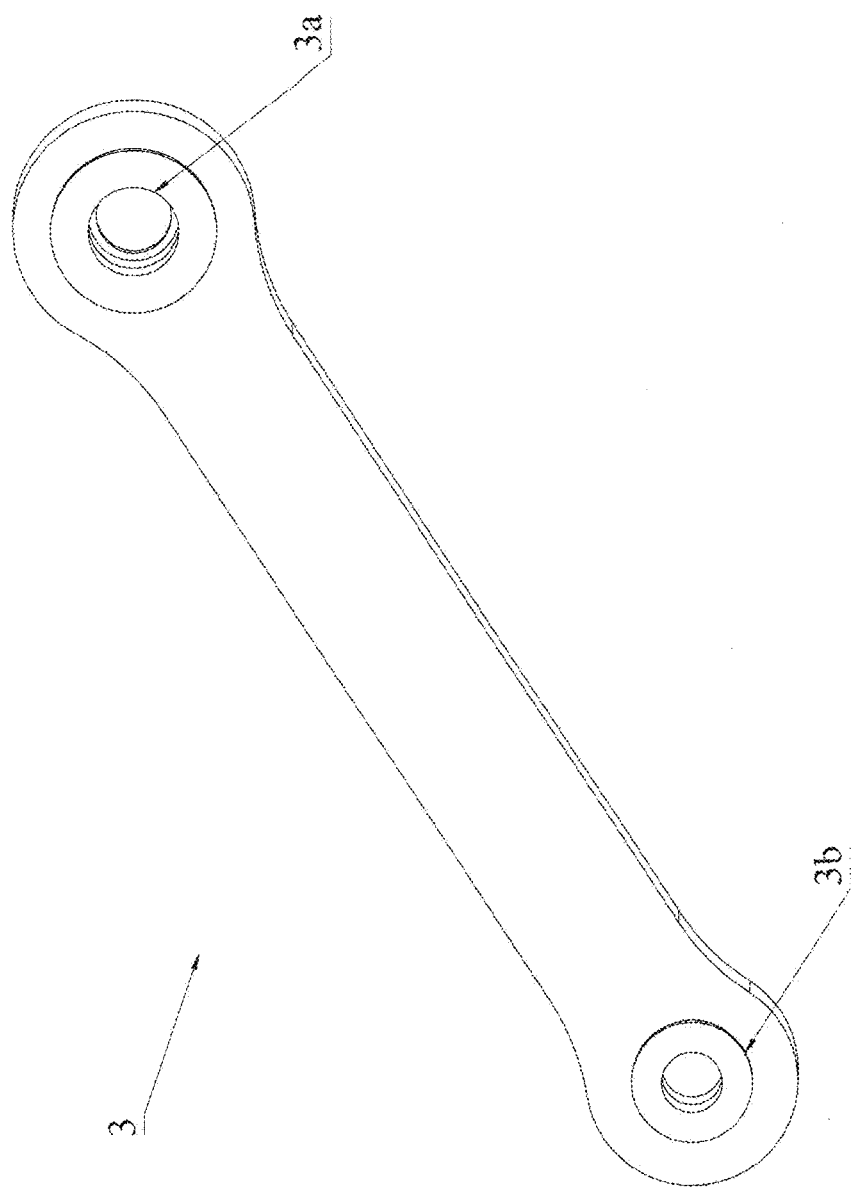
FIG. 3 is a perspective left side view of the connecting rod 3.

FIG. 3 shows connecting rod 3. Brass bushings are pressed into clearance holes 3a and 3b. At 3a the connecting rod connects the crankshaft-cam (2) at position (2b), and at 3b it connects the injector tube assembly (5) at position (5g).

FIG. 4A shows pump shaft 4a which is a single main piece; its tip 4t maintains contact with surface (2c) of the crankshaft-cam, its flange 4b is used to contain the upper end of spring 4d. Its main diameter 4c fits within narrow bore (4n) and its seal 4f is fitted to this narrow bore. The seal 4f mounts between seal diameter 4e and retaining screw 4g.

Figure 4B:
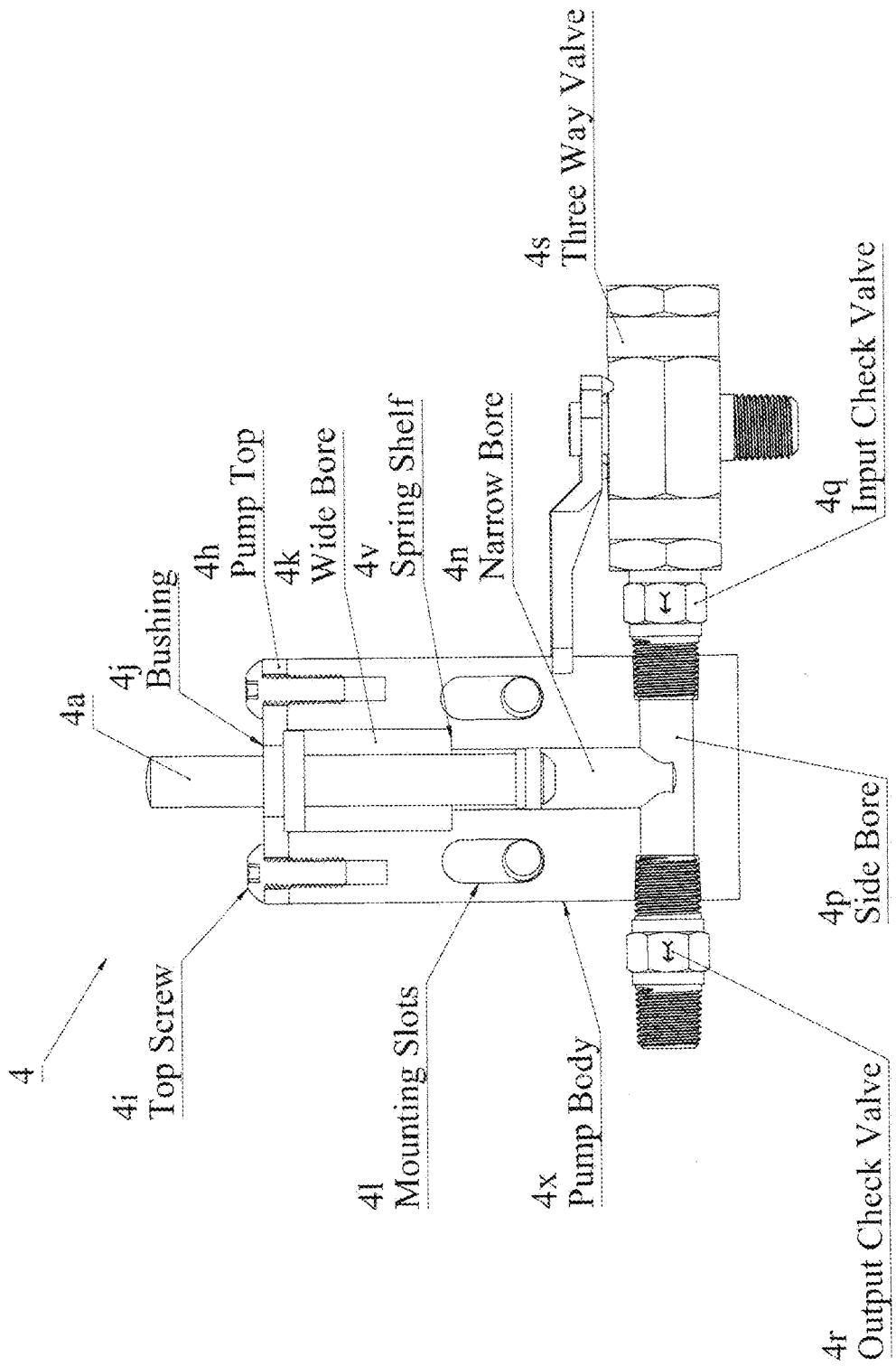

In FIG. 4B the pump has been assembled. Spring (4d), which fits within wide bore 4k, is seated on spring shelf 4v. In this figure the above described pump shaft 4a has been inserted within pump body 4x. Pump top 4h, including press-fitted bushing 4j, has been secured with two top screws 4i after spring (4d) has been inserted. Narrow bore 4n is intersected by side bore 4p. Input check valve 4q is screwed into the right side of side bore 4p, and output check valve 4r is screwed into the left side of side bore 4p. The pump assembly 4 is attached to mounting plate (1) at bolt holes (1d) through two mounting slots 4l. The two mounting holes 4l are slotted to allow for adjustment of pump displacement. In this depiction of the preferred embodiment, three way valve 4s has been attached to input check valve 4q.

Figure 5:
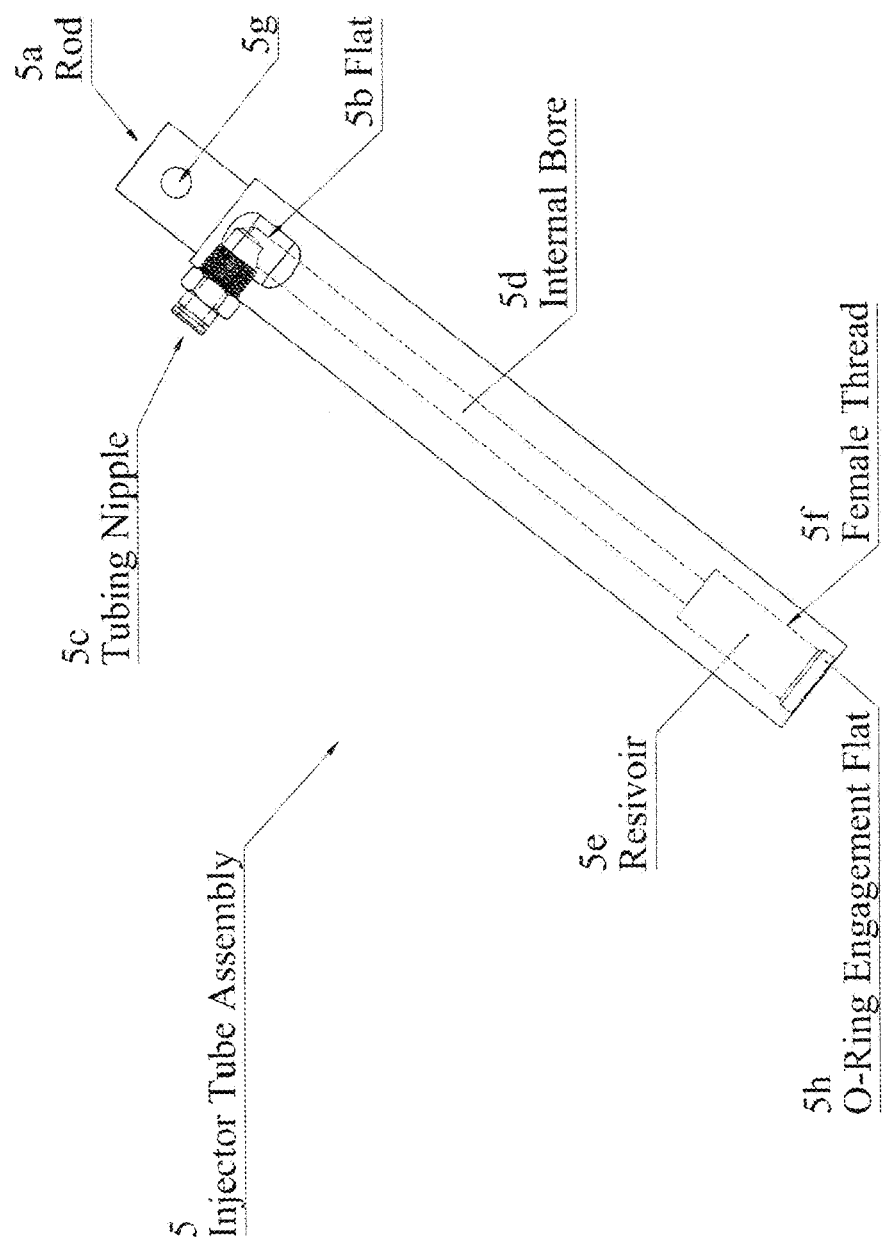
FIG. 5 is a left view of the injector tube assembly 5.

FIG. 5 shows the injector tube assembly 5 which is formed from round rod 5a which is slotted at the top end then cross-drilled with clearance hole 5g which is used to attach connecting rod (3). Rod 5a is drilled from the bottom to make internal bore 5d, or "reactant pathway", all the way to just short of 5g as shown, then it is cross drilled as shown and tubing nipple 5c is screwed into the cross hole. Internal bore 5d is counter-bored to a larger diameter to form reactant reservoir 5e. Reservoir 5e is tapped with female thread 5f and O-ring engagement flat 5h is added.

Figure 6:
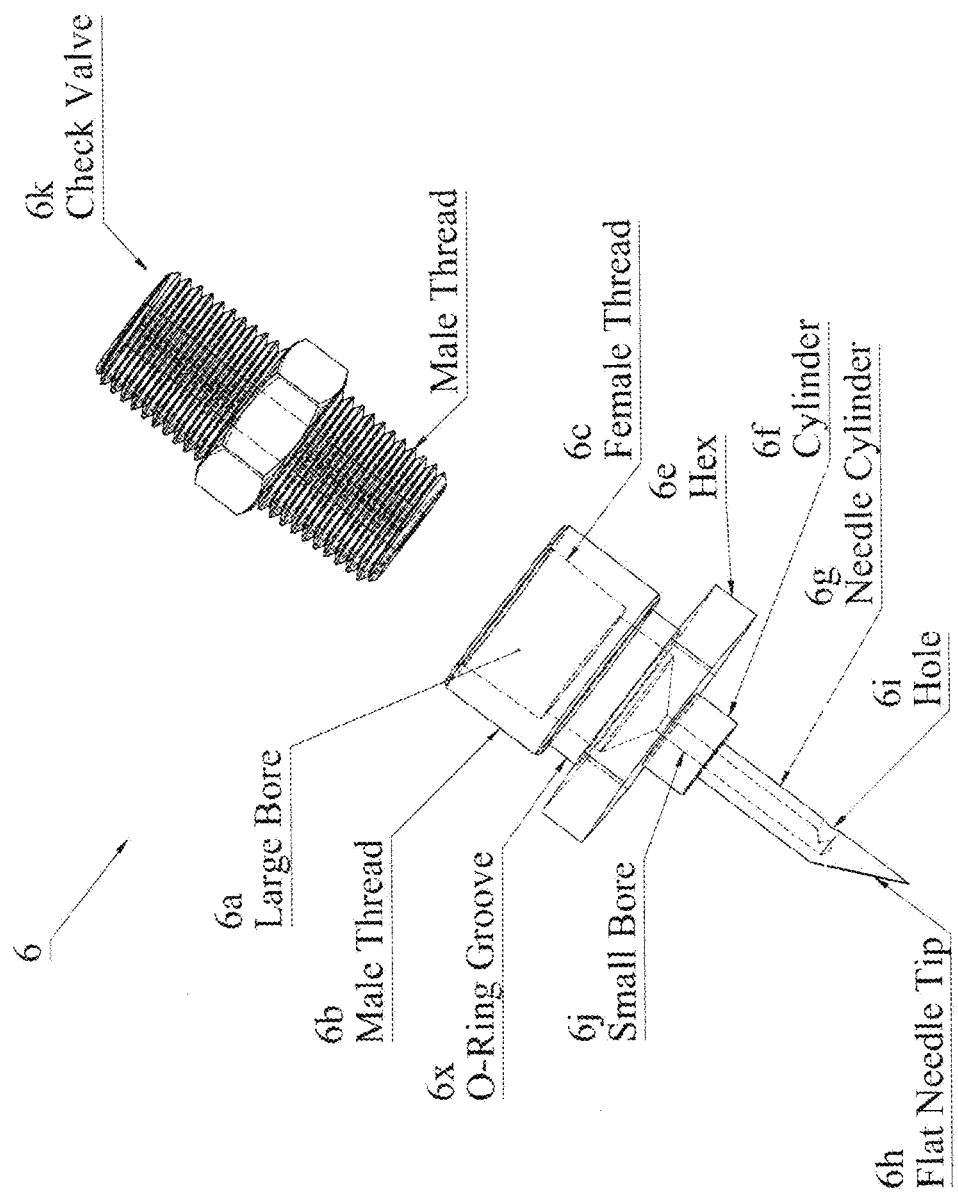
FIG. 6 is a view of the needle 6 and it's check valve 6k.

FIG. 6 shows needle 6 which is a single piece except for check valve 6k. The top of the needle includes large bore 6a which has male thread 6b on its exterior and female thread 6c on its interior; just below male thread 6b is O-ring groove 6x. Next below that is hex nut 6e which is used to screw the needle in to the injector tube (5). Next below is cylinder 6f which forms a stop when the needle is driven into an incendiary sphere; below that is needle cylinder 6g which is terminated as flat needle tip 6h. Opposite to this flat is cross drilled small hole 6i. Small bore 6j is the reactant flow-way that is drilled through the middle of needle cylinder 6g and which joins large bore 6a to hole 6i. Check valve 6k screws into large bore 6a to complete needle 6. Needle 6 seals to injector tube (5) by an O-ring which is not shown. Reservoir (5e) of the injector tube is clearance dimensioned to accommodate check valve 6k when needle 6 and injector tube (5) are joined together.

Figure 7:
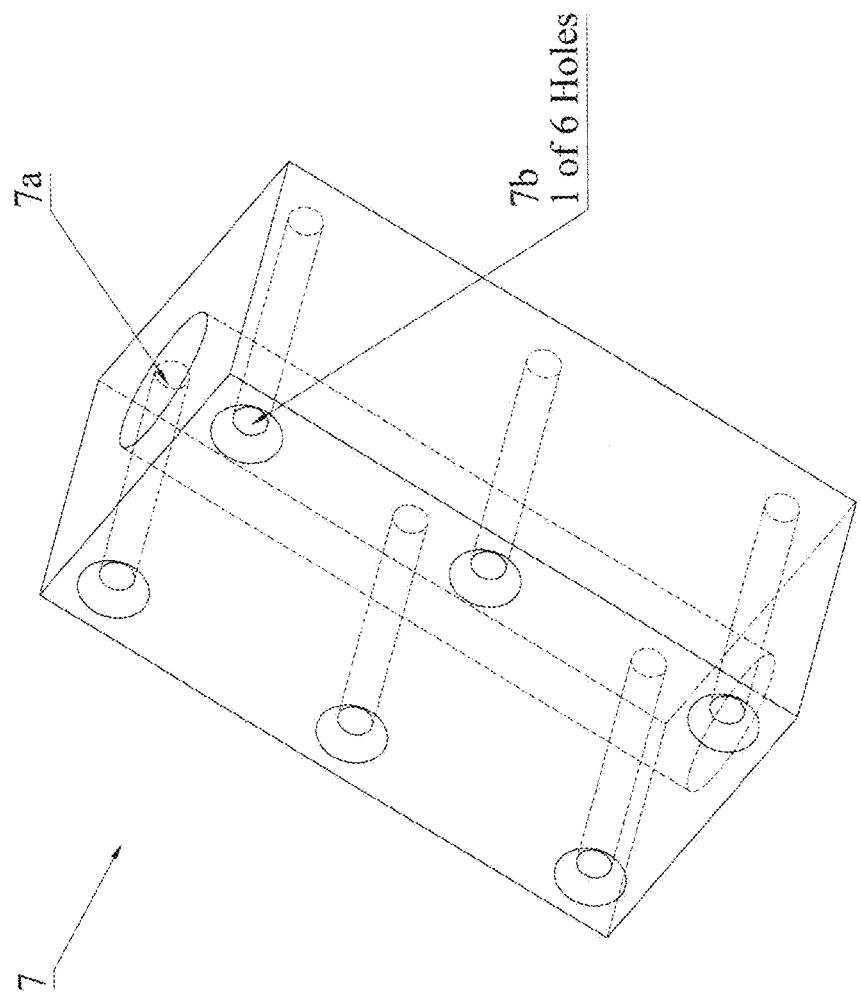
FIG. 7 is a left side perspective view of the mount block 7.

FIG. 7 shows mount block 7 which is formed from a single piece of material. Mount block 7 includes a single vertical bore 7a through its middle; bore 7a mounts and retains positioning of injector tube (5) during reciprocating action of that tube. Six identical clearance holes 7b are drilled along the two sides of mount block 7 for attachment to mounting plate (1) at threaded bolt holes (1e). It should be noted that any suitable body that included a bore to position injector tube assembly (5) could be used.

Figure 8:
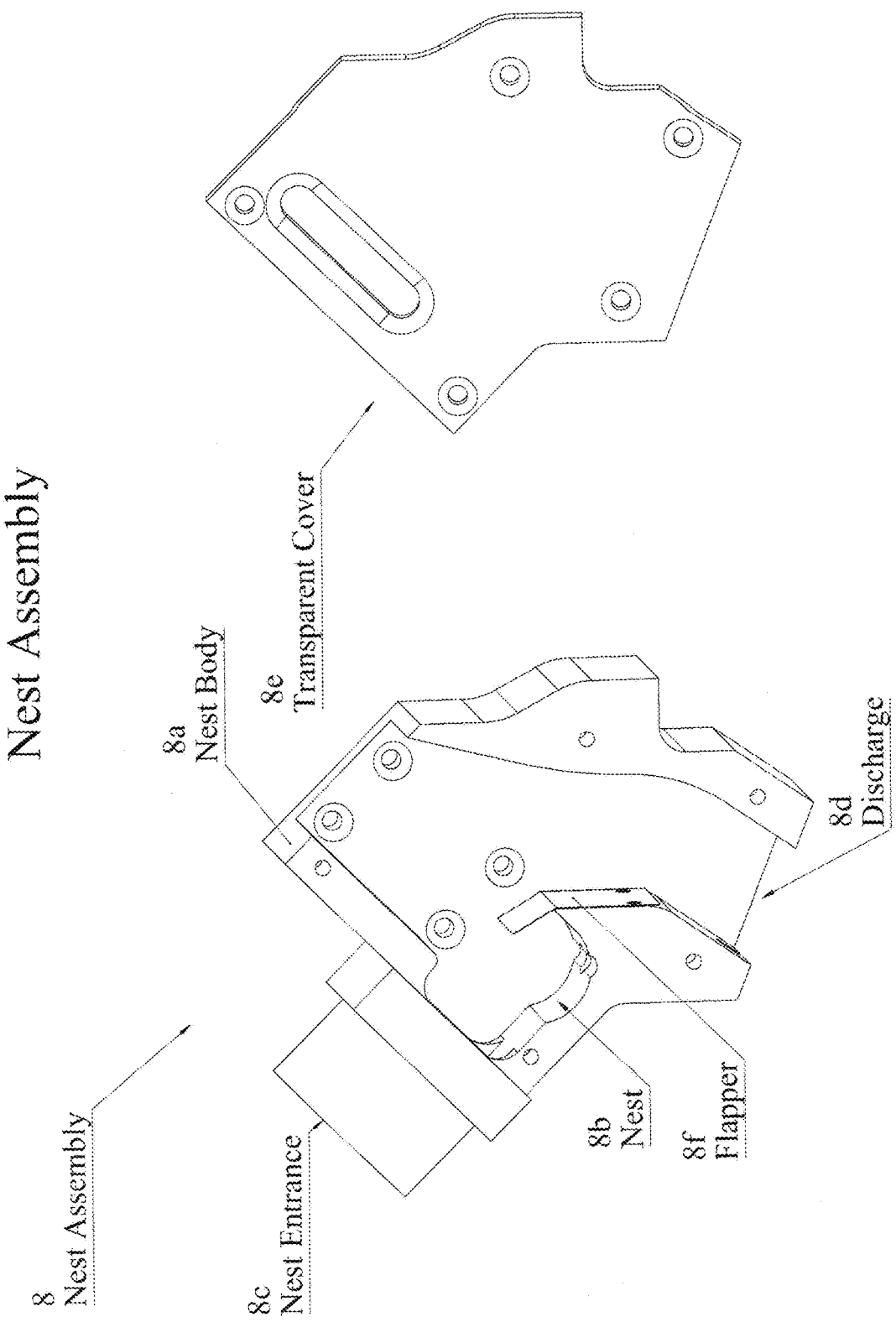
FIG. 8 shows a perspective left side view of the nest assembly 8 including a separate view of transparent cover 8e.

FIG. 8 shows nest assembly 8. Nest body 8a could also be formed from several parts that are bolted or welded together, but in the case of the preferred embodiment 8a is a single part that is machined from a single piece of material. The nest entrance 8c is a female tube stub within which the lower end of the flexible tube which supplies a serial line of incendiaries to the nest is fitted. Position 8b is "the nest" of the nest assembly; it is a curved surface whose interior radius matches the outside radius of the incendiary sphere.

Flapper 8f is a thin section of spring steel; the purpose of the flapper is to ensure that any incendiary spheres that enter the nest do not over-run it. The flapper 8f is movable to allow an incendiary to pass out of the nest when the incendiary is being withdrawn. An incendiary sitting in the nest will be pierced and fully impaled upon the needle (6), then, as the needle withdraws back towards mount block (7) the flapper 8f, by means of force exerted by the sphere, according to a preferred embodiment, bends to allow it to pass thus creating the nest exit opening through which the incendiary passes. Next, as the needle withdraws into the bore of the mount block, the incendiary sphere becomes stripped from the needle and drops through gravity into discharge 8d. Finally, the nest assembly is covered with transparent plate 8e which is connected to the nest body through the five bolt holes as shown. The transparency of plate 8e becomes both an operational and a safety feature because it allows the operator to see what is occurring inside the nest assembly.

FIG. 9 shows Functional Structure 9 which further includes main motor 10. In this figure all eight parts or assemblies described above are combined together to form a single assembly, plus, main motor 10 is installed and stop switch 21 is installed. This motor is used to rotate the crankshaft-cam 2. Functional Structure 9 as shown, if provided three things, is now an apparatus for processing charged incendiary spheres for the purpose of prescribed burning. Those three items are: controlled electrical power, a supply of incendiary spheres to nest entrance 8c and a supply of liquid reactant to input check valve (4q). In this figure, the needle 6 is in the process of piercing incendiary sphere 22.

FIG. 10 shows an example configuration whereby Functional Structure 9 is mounted, supplied with incendiaries, supplied with liquid reactant and placed inside a covered frame. For purposes of viewing this figure, the front and left covers, the front left leg, and the flexible hose tubing connecting nest entrance (8c) to hopper discharge 13 have been removed. Functional Structure 9 is connected on its top through mount hole (1a) to leg 15 and at the nest assembly to bottom plate 19. Legs 15 and 16, and the front left leg not shown, connect to plate 19 on the bottom and plate 20 on the top. Incendiary spheres are dropped in to hopper 12. A rotating agitator at the bottom of the hopper (not shown) is driven by motor 14. Incendiary spheres drop through the hose stub 13 into a flexible hollow tube which connects to the entrance to the nest (8c), and as motor 10 rotates, each individual incendiary is processed as previously described herein. Reactant is stored in tank 11 which is filled by removal of cap 18. The liquid reactant flows through tubes which connect the tank to the three way valve (4s), and which connect the output check valve (4r) to tubing nipple (5c).

Figure 11:
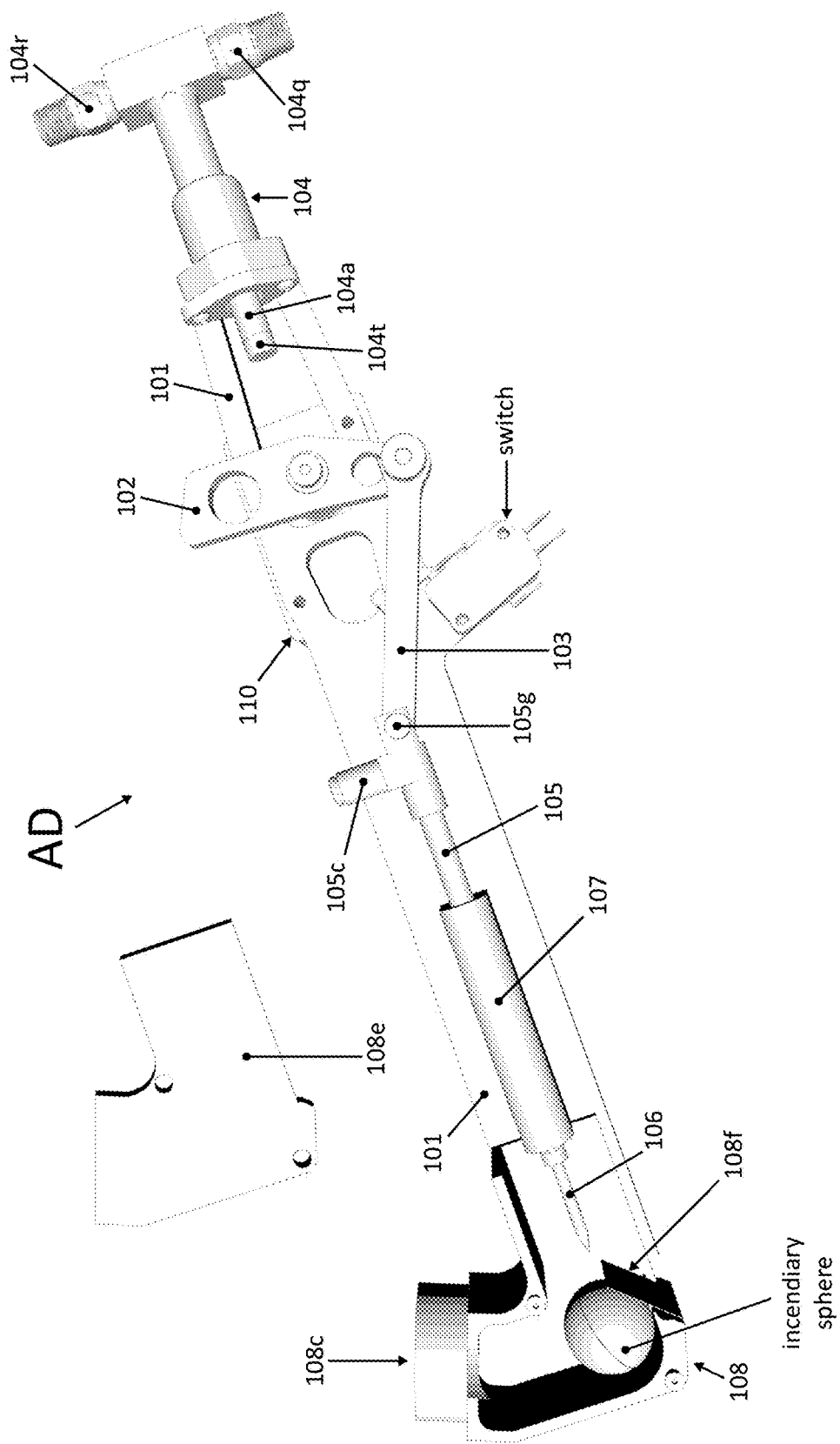
FIG. 11 shows a left side perspective view of alternate embodiment AD ('alternative-drone'). This alternative embodiment AD includes all of the functions, and all of the parts or components as shown and described in FIG. 9, and adds no additional functions or parts. The difference between the preferred embodiment and this alternative embodiment is that all of the components have been reduced, or trimmed down, for the purpose of minimizing weight.

FIG. 11 shows alternative embodiment AD which is the same as the preferred embodiment except that it is modified for optimal weight reduction. Mounting plate 101 is used to mount and position the other seven main parts or assemblies. Crankshaft-Cam 102 is attached to the driveshaft of motor 110. Connecting rod 103 attaches on its top end to crankshaft-cam 102 and on the other, or lower, end to the top of the injector tube assembly 105 at connecting rod attachment hole 105g. Reactant flow to the injector tube is connected at tubing nipple 105c. Pump assembly 104 has identical inner components to those described above in relation to Drawings 4A and 4B. On the exterior of pump assembly 104 is seen pump shaft 104a and pump shaft tip 104t as well as input check valve 104q and output check valve 104r, all of which are also identical to the same parts of the preferred embodiment which are more fully described in the above references to Drawings 4A and 4B. Injector tube assembly 105 is mounted, for reciprocating motion, within the bore of injector tube mounting body 107. At the terminus of injector tube assembly 105 is seen needle 106. Nest assembly 108 shows nest entrance 108c, flapper 108f and transparent cover 108e.

Referring to FIG. 12 there is depicted a drone 300 shown with load rails 311 and an incendiary sphere hopper 312 carried by the drone 300. The hopper 312 is attached to the drone 300 at load rails 311. The hopper 312 is shown having an incendiary feeding hose stub 313 which feeds into the nest entrance 108c via flexible feeding hose 314. The apparatus AD may be suspended from hopper 312 via any suitable structure such as supporting posts 315 and 316 shown connecting apparatus AD to hopper 312. Output check valve 104r is connected to hose barb 105c by flexible hose tubing 317. Flexible hose tubing 318 connects input check valve 104q to the reactant tank (not shown) which is mounted on the back end of hopper 312. The electrical power used to rotate motor 110 which activates sphere processing mechanism AD is preferably sourced from the drone's existing battery(s). The actuation of the device AD to process and dispense spheres may be controlled remotely using the drone controller which preferably is configured to turn operations of the device AD on for dispensing (e.g., when the drone 300 is situated over the designated burn area to receive the charged spheres) and off when dispensing is not required (for drone take offs, landings, and travel en route to the designate area). Alternatively, the drone 300 may be controlled using an autonomous programming mode that designates a geo location for sphere delivery, and the drone 300 upon reaching that location is programmed to actuate the AD device to deliver charged spheres in the designated location. Delivery may take place using any pattern, such as rows, circles, orbits, and the like. A controller, microcontroller, microchip or other circuitry may be used to interface the operations of the device AD with the drone, including to receive remote commands from the drone controller.

What I claim is:

1. An apparatus for processing incendiary spheres, said apparatus comprising:
   a) a mounting plate;
   b) a reciprocating injector tube that includes a flow way for liquid reactant;
   c) a sharpened tube or needle at the terminus of said reciprocating injector tube whereby said sharpened tube or needle includes an internal bore that is connected to the flow way of said reciprocating injector tube;
   d) a mounting body mounted to said mounting plate, to mount and retain positioning of said reciprocating injector tube during the reciprocating motion of said tube;
   e) a nest to hold a respective one of said incendiary spheres while the respective one of the spheres is being punctured by said sharpened tube or needle;
   f) said nest having an entrance for receiving a serial feed of incendiary spheres and an exit opening through which spheres are withdrawn;
   g) a lower discharge opening positioned below said mounting body through which discharged spheres fall by force of gravity;
   h) a pump configured to pump liquid reactant through said reciprocating injector tube and connected sharpened tube or needle; and i) means to drive the reciprocating motion of said reciprocating injector tube;

j) wherein the reciprocating motion of said injector tube and connected sharpened tube or needle includes a full down position at one end of its reciprocating motion whereby the sharpened tube or needle punctures and impales the incendiary sphere that is seated in the nest, and a full up position at the other end of its reciprocating motion whereby the sharpened tube or needle becomes withdrawn inside of said mounting body; and k) whereby the incendiary sphere continues to be held on the sharpened tube or needle after said sharpened tube or needle has punctured the incendiary sphere, and wherein said sphere is withdrawn from the nest during the upward reciprocating motion of said injector tube.

2. The apparatus of claim 1, whereby said pump pumps said liquid reactant through the sharpened tube or needle after said sharpened tube or needle punctures said incendiary sphere.

3. The apparatus of claim 2, said mounting body having a bore therein, and whereby the bore of said mounting body is smaller than the outside diameter of said incendiary spheres so that when the sharpened tube or needle is fully withdrawn within said mounting body the incendiary sphere becomes stripped off of the sharpened tube or needle.

4. The apparatus of claim 3, whereby the said stripped off incendiary sphere falls by gravity into said lower discharge opening.

5. The apparatus of claim 1, wherein said means to drive the reciprocating motion of said reciprocating injector tube comprises a crankshaft.

6. The apparatus of claim 1, wherein said pump comprises a mechanical pump.

7. The apparatus of claim 6, whereby said mechanical pump works by reciprocating motion.

8. The apparatus of claim 7, whereby said mechanical pump includes an input check valve and an output check valve.

9. The apparatus of claim 7, including a cam mounted on said mounting plate, and wherein said mechanical pump reciprocating motion is driven by said cam.

10. The apparatus of claim 5, whereby said crankshaft includes a cam surface on its outer perimeter forming a crankshaft-cam.

11. The apparatus of claim 10, whereby said crankshaft-cam drives both the reciprocating motion of the injector tube and the reciprocating motion of the mechanical pump in a synchronized manner.

12. The apparatus of claim 1, whereby said nest includes a flapper positioned in a blocking position that keeps the incendiary sphere within said nest.

13. The apparatus of claim 12, wherein said flapper is movable or bendable to an unblocking position that permits the incendiary sphere to exit the nest.

14. The apparatus of claim 1, wherein said incendiary spheres contain an incendiary material such as potassium permanganate.

15. The apparatus of claim 1, wherein said liquid reactant that is pumped through said reciprocating injector tube and connected sharpened tube or needle comprises ethylene glycol.

16. The apparatus of claim 1, further comprising an incendiary feed tube communicating with the nest entrance.

17. The apparatus of claim 1, including an open area or passageway extending from said nest and connecting said nest with said lower discharge opening.

18. The apparatus of claim 17, including a one way valve provided between said nest and said lower discharge opening.

19. The apparatus of claim 16, including a hopper, and wherein said incendiary feed tube connects said hopper to said nest.

20. The apparatus of claim 1, whereby all components of the apparatus are designed with the objective of minimizing weight for the purpose of rendering the apparatus more useful and effective when deployed by drone.

21. A method for processing a serial feed of incendiary spheres to be charged with a liquid reactant, comprising:

a) delivering a serial feed of spheres to be charged, one at a time, to a nest, said nest having an entrance for receiving each successive one of the serial feed of incendiary spheres and an exit opening through which said spheres are withdrawn;

b) injecting said incendiary sphere while said sphere is held in said nest, wherein injecting comprises puncturing said incendiary sphere with a sharpened tube or needle, wherein said sharpened tube or needle is located at the terminus of said reciprocating injector tube, said sharpened tube or needle including an internal bore that is connected to the flow way of said reciprocating injector tube;

c) wherein the reciprocating injector tube includes a flow way for liquid reactant;

d) pumping liquid reactant into the sphere with a pump configured to pump the liquid reactant through said reciprocating injector tube and connected sharpened tube or needle;

e) withdrawing the sphere from the exit opening of the nest with said sharpened tube or needle;

f) retracting the sharpened tube or needle from the sphere to release the sphere from the sharpened tube or needle; and g) delivering the sphere to a lower discharge opening via gravity after the sphere is released from the sharpened tube or needle;

h) wherein injecting said incendiary sphere that is held in the nest includes puncturing and impaling the incendiary sphere by the reciprocating motion of said injector tube and connected sharpened tube or needle being moved to a full down position at one end of its reciprocating motion whereby the sharpened tube or needle punctures and impales the incendiary sphere that is seated in the nest, and wherein releasing the sphere from the sharpened tube or needle includes bringing said injector tube and connected sharpened tube or needle to a full up position at the other end of its reciprocating motion whereby the sharpened tube or needle becomes withdrawn inside of said mounting body; and i) whereby the incendiary sphere continues to be held on the sharpened tube or needle after said sharpened tube or needle has punctured the incendiary sphere, and wherein said sphere is withdrawn from the nest during the upward reciprocating motion of said injector tube.

* * * * *